United States Patent
Bajic et al.

(10) Patent No.: US 11,010,132 B2
(45) Date of Patent: May 18, 2021

(54) PROCESSING CORE WITH DATA ASSOCIATIVE ADAPTIVE ROUNDING

(71) Applicant: Tenstorrent Inc., Toronto (CA)

(72) Inventors: Ljubisa Bajic, Toronto (CA); Alex Cejkov, Toronto (CA); Lejla Bajic, Toronto (CA)

(73) Assignee: Tenstorrent Inc., Toronto (CA)

( * ) Notice: Subject to any disclaimer, the term of this patent is extended or adjusted under 35 U.S.C. 154(b) by 58 days.

(21) Appl. No.: 16/573,728

(22) Filed: Sep. 17, 2019

(65) Prior Publication Data

US 2020/0104098 A1    Apr. 2, 2020

Related U.S. Application Data

(60) Provisional application No. 62/738,286, filed on Sep. 28, 2018.

(51) Int. Cl.
*G06F 7/499* (2006.01)
*G06F 7/57* (2006.01)

(52) U.S. Cl.
CPC .......... *G06F 7/49947* (2013.01); *G06F 7/57* (2013.01); *G06F 2207/4824* (2013.01)

(58) Field of Classification Search
CPC ......... G06F 7/49947–49984; G06F 2207/4824
See application file for complete search history.

(56) References Cited

U.S. PATENT DOCUMENTS

| 5,787,408 | A | 7/1998 | DeAngelis |
| 2013/0007076 | A1 | 1/2013 | Wegener |
| 2014/0365548 | A1 | 12/2014 | Mortensen |
| 2018/0018558 | A1 | 1/2018 | Lee et al. |
| 2018/0046903 | A1 | 2/2018 | Yao et al. |
| 2018/0232640 | A1* | 8/2018 | Ji .......................... G06N 3/082 |
| 2019/0228274 | A1* | 7/2019 | Georgiadis ........... G06K 9/6274 |

(Continued)

FOREIGN PATENT DOCUMENTS

WO    2018000309 A1    1/2018

OTHER PUBLICATIONS

Y. Huan, Y. Qin, Y. You, L. Zheng and Z. Zou, "A multiplication reduction technique with near-zero approximation for embedded learning in IoT devices", Proc. Int. Syst. Chip Conf. (SOCC), pp. 102-107, 2016 (Year: 2016).*

(Continued)

*Primary Examiner* — Matthew D Sandifer
(74) *Attorney, Agent, or Firm* — Daylight Law, P.C.

(57) ABSTRACT

Processing cores with data associative adaptive rounding and associated methods are disclosed herein. One disclosed processing core comprises an arithmetic logic unit cluster configured to generate a value for a unit of directed graph data using input directed graph data, a comparator coupled to a threshold register and a data register, a core controller configured to load a threshold value into the threshold register when the value for the unit of directed graph data is loaded into the data register, and a rounding circuit. The rounding circuit is configured to receive the value for the unit of directed graph data from the arithmetic logic unit cluster and conditionally round the value for the unit of directed graph data based on a comparator output from the comparator.

34 Claims, 11 Drawing Sheets

(56) References Cited

U.S. PATENT DOCUMENTS

2019/0230380 A1* 7/2019 Ogasawara ........... G06F 17/156

OTHER PUBLICATIONS

Extended European Search Report dated Mar. 5, 2020 from European Application No. 19198828.6, 11 pages.
Han et al., "Learning Both Weights and Connections for Efficient Neural Networks", Computer Science, Neural and Evolutionary Computing, retrieved from the Internet: on Aug. 4, 2017: URLhttp://arXiv.org/pdf/1506.02626.pdf, Oct. 30, 2015, 9 pages.
Reagen et al., "Minerva: Enabling Low-Power, Highly Accurate Deep Neural Network Accelerators", 2013 21st International Conference on Program Comprehension, IEEE, Jun. 18, 2016, pp. 2267-2278.
Wielgosz et al., "Compressing 3D-CNNs for Hardware-Efficient Object Classification in Video Streams", 2018 International Conference on Signals and Electronic Systems, Sep. 10-12, 2018, pp. 275-280.
Choi et al., "Fixed-Point Roundoff Error Analysis of Large Feedforward Neural Networks", Proceedings of 1993 International Joint Conference on Neural Networks, pp. 1947-1950.
Gupta et al., "Deep Learning with Limited Numerical Precision", arXiv:1502.02551v1 [cs.LG], Feb. 9, 2015, 10 pages.
Huan et al., "A Multiplication Reduction Technique with Near-Zero Approximation for Embedded Learning in IoT Devices", IEEE, 978-1-5090-1367, Aug. 2016, pp. 102-107.
Köster et al., "Flexpoint: An Adaptive Numerical Format for Efficient Training of Deep Neural Networks", arXiv:1711.02213v2 [cs.LG] Dec. 2, 2017, 14 pages.
Na et al., "On-Chip Training of Recurrent Neural Networks with Limited Numerical Precision", IEEE, 978-1-5090-6182, Feb. 2017, pp. 3716-3723.
Nomura et al., "A Convolutional Neural Network VLSI Architecture Using Sorting Model for Reducing Multiply-and-Accumulation Operations", ICNC 2005, LNCS 3612, 2005, pp. 1006-1014.
Ott et al., "Recurrent Neural Networks with Limited Numerical Precision", arXiv:1608.06902v2 [cs.NE] Feb. 26, 2017, 11 pages.

* cited by examiner

FIG. 2
(Related Art)
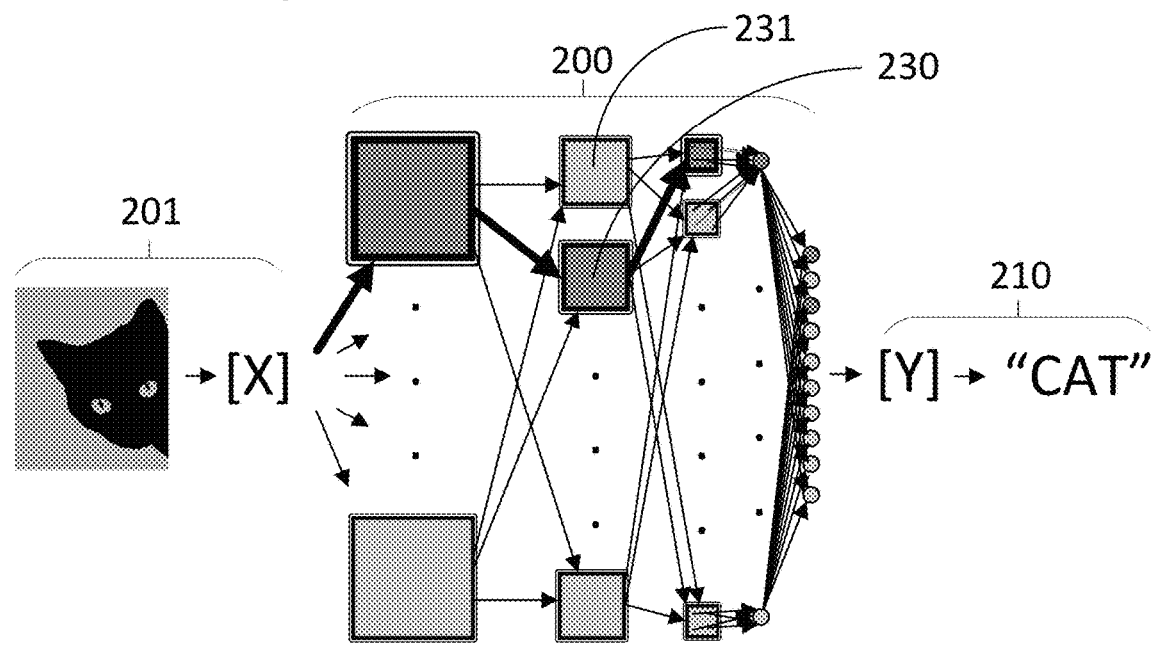
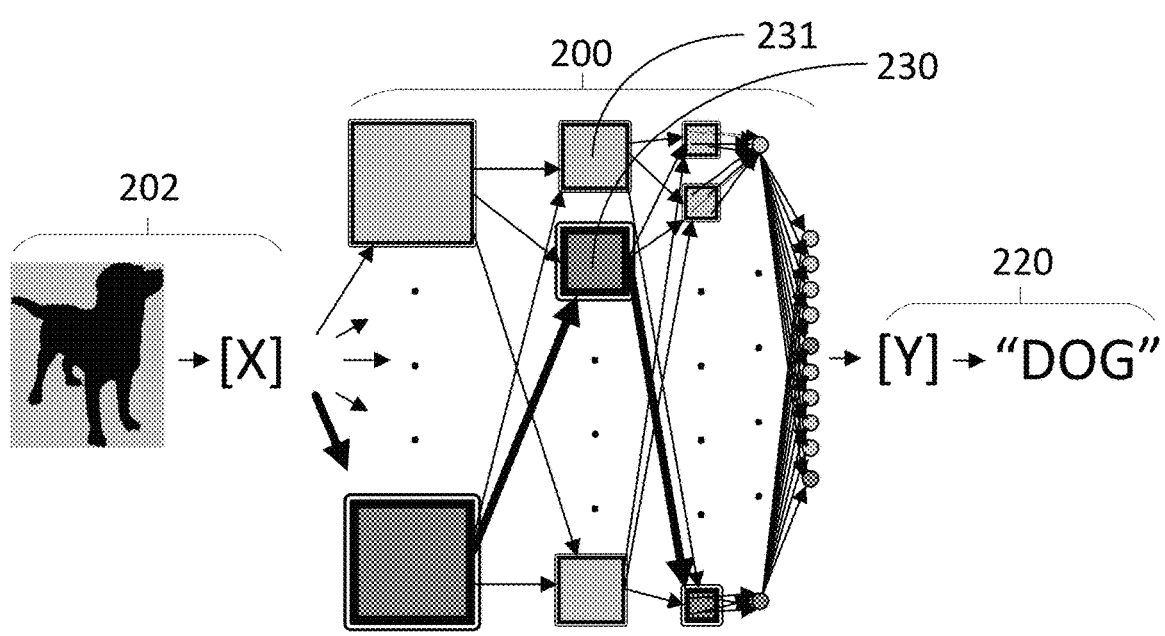

PROCESSING CORE WITH DATA ASSOCIATIVE ADAPTIVE ROUNDING

CROSS REFERENCE TO RELATED APPLICATIONS

This application claims the benefit of U.S. Provisional Patent Application No. 62/738,286 filed Sep. 28, 2018, which is incorporated by reference herein in its entirety for all purposes.

BACKGROUND

The recent surge in the performance of machine intelligence systems is not due to the development of revolutionary new algorithms. Indeed, the core algorithms used in machine intelligence applications today stem from a body of work that is now over half a century old. Instead, it has been improvements in the hardware and software that implement machine intelligence algorithms in an efficient manner that has fueled the recent surge. Algorithms that were once too computationally intensive to implement in a useful manner with even the most sophisticated of computers can now be executed with specialized hardware on an individual user's smart phone. The improvements in hardware and software take various forms. For example, graphical processing units traditionally used to process the vectors used to render polygons for computer graphics have been repurposed in an efficient manner to manipulate the data elements used in machine intelligence processes. As another example, certain classes of hardware have been designed from the ground-up to implement machine intelligence algorithms by using specialized processing elements such as systolic arrays. Further advances have centered around using collections of transistors and memory elements to mimic, directly in hardware, the behavior of neurons in a traditional artificial neural network (ANN). There is no question that the field of machine intelligence has benefited greatly from these improvements. However, despite the intense interest directed to these approaches, machine intelligence systems still represent one of the most computationally and energy intensive computing applications of the modern age and present a field that is ripe for further advances.

The reason machine intelligence applications are so resource hungry is that the data structures being operated on are generally very large, and the number of discrete primitive computations that must be executed on each of the data structures are likewise immense. A traditional ANN takes in an input vector, conducts calculations using the input vector and a set of weight vectors, and produces an output vector. Each weight vector in the set of weight vectors is often referred to as a layer of the network, and the output of each layer serves as the input to the next layer. In a traditional network, the layers are fully connected, which requires every element of the input vector to be involved in a calculation with every element of the weight vector. Therefore, the number of calculations involved increases with a power law relationship to the size of each layer. Furthermore, this aspect of machine intelligence algorithms makes them difficult to parallelize because the calculations for each layer depend on the output of the prior layer.

The problems mentioned in the prior paragraph are further exacerbated by modern ANNs. Modern ANN approaches are often referred to in the industry and literature as "deep learning" approaches. This is often a reference to the substantial number of layers involved, or the complexity of the relationships between the outputs of one layer and the inputs of the other layers. For example, in a modern deep learning ANN, the outputs of a downstream layer could be fed back to a prior layer which thereby adds a recursive element to the overall computation. Both the increase in layers, and the additional complexity associated with recursive relationships between the layers, increase the computational resources needed to implement a modern ANN.

FIG. 1 illustrates a directed graph 100 for the computation of a modern machine intelligence system. The input to directed graph 100 is an input tensor X. The output of directed graph 100 is an output tensor Y. The input could be an encoding for a picture, such as an image of a cat 101. In this example, execution of directed graph 100 involves the graph providing an encoding of a textual guess as to what the content of the encoded image contained. The graph output can be referred to as an inference generated by the directed graph because the machine intelligence system is effectively inferring what the picture shows from the encoding of the picture. As such, if directed graph 100 represented a properly trained machine intelligence system, execution of graph 100 with input tensor X would produce an output tensor Y which encoded the word "CAT" as illustrated.

The edges of directed graph 100 represent calculations that must be conducted to execute the graph. In this example, the graph is broken into two sections—a convolutional section 102 and a fully connected section 103. The convolutional portion can be referred to as a convolutional neural network (CNN). The vertices in the directed graph of CNN 102 form a set of layers which includes layers 106, 107, and 108. The layers each include sets of tensors such as tensors 109, 110, and 111. The vertices in the directed graph of fully connected section 103 also form a set of layers which includes layers 112 and 113. Each edge in directed graph 100 represents a calculation involving the origin vertex of the edge. In CNN 102, the calculations are convolutions between the origin vertex and a filter. Each edge in CNN 102 is associated with a different filter $F_{11}$, $F_{n1}$, $F_{12}$, $F_{n2}$ etc. As illustrated, filter $F_{12}$ and tensor 109 are subjected to a full convolution to generate one element of tensor 111. Filter $F_{12}$ is "slid around" tensor 109 until a convolution operation has been conducted between the filter and the origin vertex. In other approaches, filter $F_{12}$ and a portion of tensor 109 are multiplied to generate one element of tensor 111 and the full convolution is used to generate multiple elements of tensor 111. In fully connected section 103, the calculations are multiplications between a set of weights and the values from the prior layer. In fully connected section 103, each edge is associated with a unique weight value that will be used in the calculation. For example, edge 114 represents a multiplication between weight $w_n$ and input value 115. The value of element 116 is the sum of a set of identical operations involving all the elements of layer 112 and a set of weight values that uniquely correspond to the origin vertex of each edge that leads to element 116.

Execution of directed graph 100 involves many calculations. In the illustration, dots are used in the vertical directions to indicate the large degree of repetition involved in the directed graph. Furthermore, directed graph 100 represents a relatively simply ANN, as modern ANNs can include far more layers with far more complex interrelationships between the layers. Although not illustrated by directed graph 100, the outputs of one layer can loop back to be the inputs of a prior layer to form what is often referred to as a recursive neural network (RNN). The high degree of flexibility afforded to a machine intelligence system by having numerous elements, along with an increase in the number of layers and complexity of their interrelationships, makes it unlikely that machine intelligence systems will decrease in complexity in the future. Therefore, the computational complexity of machine intelligence systems is likely to increase in the future rather than diminish.

BRIEF DESCRIPTION OF THE DRAWINGS

FIG. 2 illustrates a directed graph of an artificial neural network generating two different inferences from two different inputs in accordance with the related art.

SUMMARY

Figure 1:
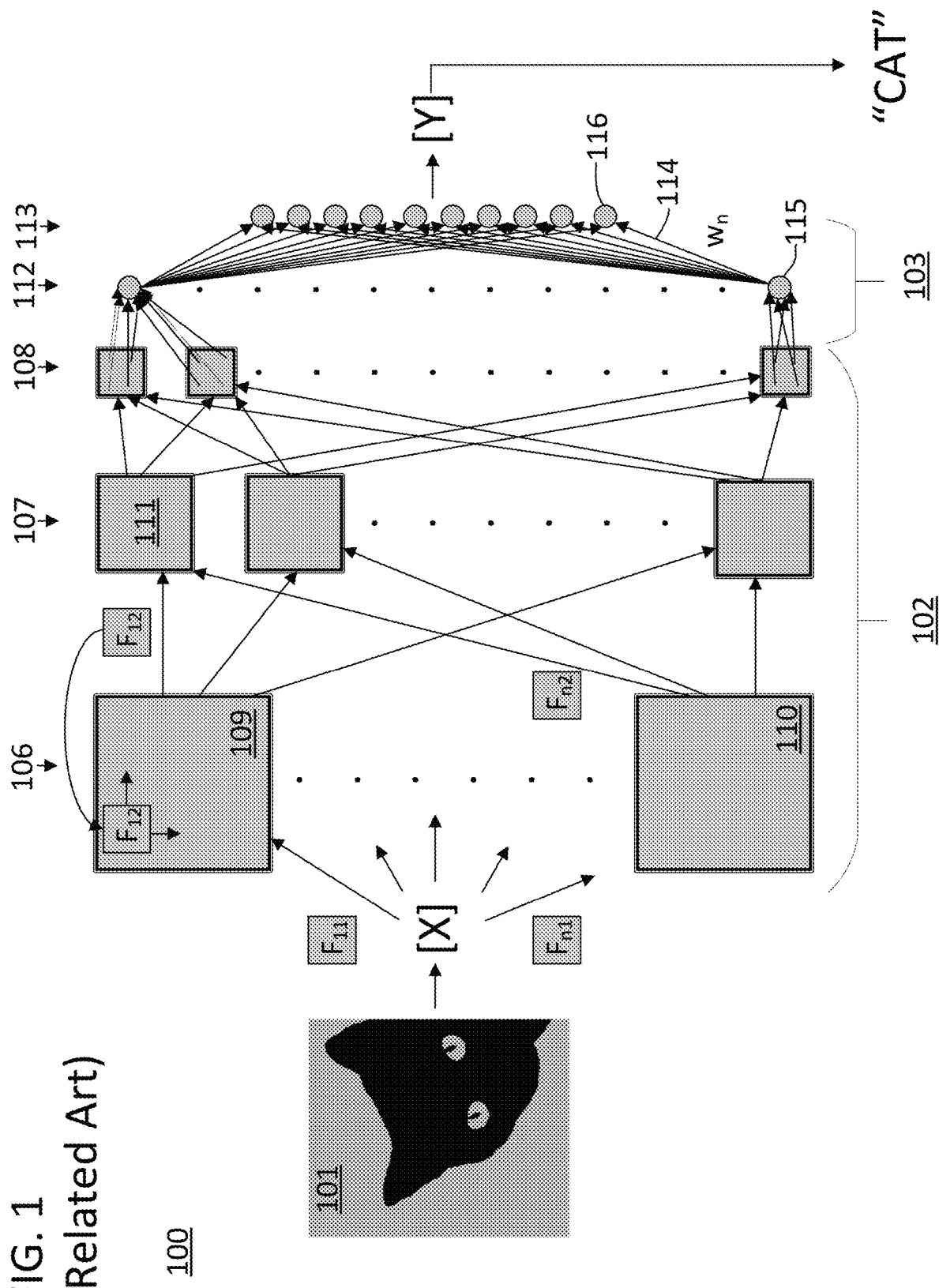
FIG. 1 illustrates a directed graph of an artificial neural network in accordance with the related art.

Processing cores with data associative adaptive rounding and associated methods are disclosed herein. Certain processing cores disclosed herein can be beneficially applied towards the execution of directed graphs. Certain processing cores disclosed herein can be beneficially applied toward the execution of an artificial neural network (ANN) in which an inference is generated in response to an input to the ANN. In specific embodiments, the use of data associative rounding increases the computational efficiency and decreases the power consumption associated with generating an inference from an ANN using a processing core with all else held equal. The use of data associative rounding can allow the generated inference to maintain fidelity to an inference generated without rounding while at the same time decreasing the power and computational resource consumption of the processing core.

Certain processing cores disclosed herein are particularly amenable to use with sparse directed graphs which need to be accurately executed. An example of a sparse directed graph is one used to instantiate an ANN in which most of the computations involve zero or near-zero data values that will not have an appreciable impact on an inference generated from the ANN. However, rounding all the near-zero values in such an ANN will not result in an accurate execution because certain near-zero data values may have a dispositive impact on the inference generated by the ANN. Accordingly, it is generally insufficient to apply a blanket rule in which all near-zero data values are forced to zero to alleviate the computational complexity of generating an inference from an ANN as that approach will lead to the generation of approximated values that do not maintain enough fidelity to the appropriate inference. Instead, rounding can be applied in a pattern that is associated to the underlying data of the directed graph, such that computational resources and power resources are consumed to a minimal degree while the accuracy of the generated inferences is preserved.

FIG. 2 illustrates a single directed graph 200 generating separate inferences 210 and 220 from two different respective inputs 201 and 202. As illustrated, directed graph 200 performs as desired in both instances and generates the inference "CAT" in response to a picture of a cat and the inference "DOG" in response to a picture of a dog. The directed graph is highlighted differently in the two instances. This highlighting is reflective of the fact that a single directed graph will have high levels of activation in different places based on the inputs provided. The highlighted paths through the directed graph illustrate the most important values computed during the execution of the graph. As illustrated, the output of the second layer includes a tensor 230 with important inference-dispositive activation in both executions and a tensor 231 with less important activation in both executions. Accordingly, a processing core that is configured to allow for the execution of directed graph 200 must take care to preserve the accuracy of the computations that generate the values of tensor 230 but may be able to let the accuracy of the computations that generated tensor 231 relax while still being able to generate the correct inference in both cases. As such, different levels of rounding can be associated with the directed graph data that is tensor 230 as compared to the directed graph data that is tensor 231.

Certain processing cores disclosed herein apply data associative rounding by associating a threshold with directed graph data, and rounding a computation involving that directed graph data using the associated threshold. The processing core can associate the threshold and directed graph data in a myriad of ways as will be described via specific examples below in the detailed disclosure. As used herein, all the data used to instantiate, execute, and modify a directed graph can be referred to as "directed graph data." In the specific case of ANNs, the directed graph data can include specific activations, weights, biases, or any intermediate results necessary for the drawing of an inference from or applying training to the network. As used herein, an association to directed graph data refers to the data structure in the directed graph as opposed to the actual values held by that data structure during any given execution of the directed graph. In specific processing cores disclosed herein, thresholds can be "associated" with directed graph data via the use of data stored in the processing core and/or in a cache memory that is randomly accessible to the processing core. The processing core can store a set of thresholds where each threshold in the set of thresholds is associated with a different unit of directed graph data. These thresholds can be programmatically set via an external controller. The processing core can also store a set of values used to calculate the thresholds internally to the operation of the processing core where each value in the set of values is associated with a different unit of directed graph data. These values can be programmatically set via an external controller.

In the specific case of a processing core executing a directed graph to generate an inference from an ANN, the processing core can be configured such that the weights and/or filters of the ANN are stored within the registers on the processing core and/or be available to a cache memory of the processing core via random memory access. In keeping with the same example, the processing core can be configured to store the data necessary to support the associations and apply thresholds when necessary in the registers on the processing core and/or in that same cache memory. In specific embodiments, the thresholds and associations can be programmatically provided to the internal memory locations or the cache memory via an external controller.

In specific embodiments of the invention, a processing core is provided. The processing core comprises a processing cluster configured to generate a value for a unit of directed graph data using input directed graph data. The processing core also includes a core controller configured to load a threshold value into a threshold register when the value for the unit of directed graph data is loaded into a data register. The processing core also includes a comparator coupled to the threshold register and the data register and configured to generate a comparator output based on: (i) the threshold value in the threshold register; and (ii) the value for the unit of directed graph data in the data register. The processing core also includes a rounding circuit: (i) configured to receive the value for the unit of directed graph data from the processing cluster; and (ii) configured to conditionally round the value for the unit of directed graph data based on the comparator output from the comparator.

In specific embodiments of the invention, a method is provided. The method comprises associating, in a processing core, a threshold with a unit of directed graph data. The directed graph data being from a directed graph. The method also comprises executing, using the processing core, the directed graph. The method also comprises generating, while executing the directed graph and using a processing cluster in the processing core, a value for the unit of directed graph data. The method also comprises generating a comparison of the value of the unit of directed graph data and the threshold. The method also comprises conditionally rounding, based on the comparison and using a rounding circuit in the processing core, the value of the unit of directed graph data.

In specific embodiments of the invention, a processing core is provided. The processing core comprises a means for associating a threshold value and a unit of directed graph data according to an association, a means for generating a value for the unit of directed graph data using input directed graph data, a means for generating a comparison of the threshold value and the value for the unit of directed graph data using the association, and a means for conditionally rounding the value for the unit of directed graph data based on the comparison.

DETAILED DESCRIPTION

Specific methods and systems associated with a processing core with data associative adaptive rounding in accordance with the summary above are provided in this section. The methods and systems disclosed in this section are nonlimiting embodiments of the invention, are provided for explanatory purposes only, and should not be used to constrict the full scope of the invention.

Figure 3:
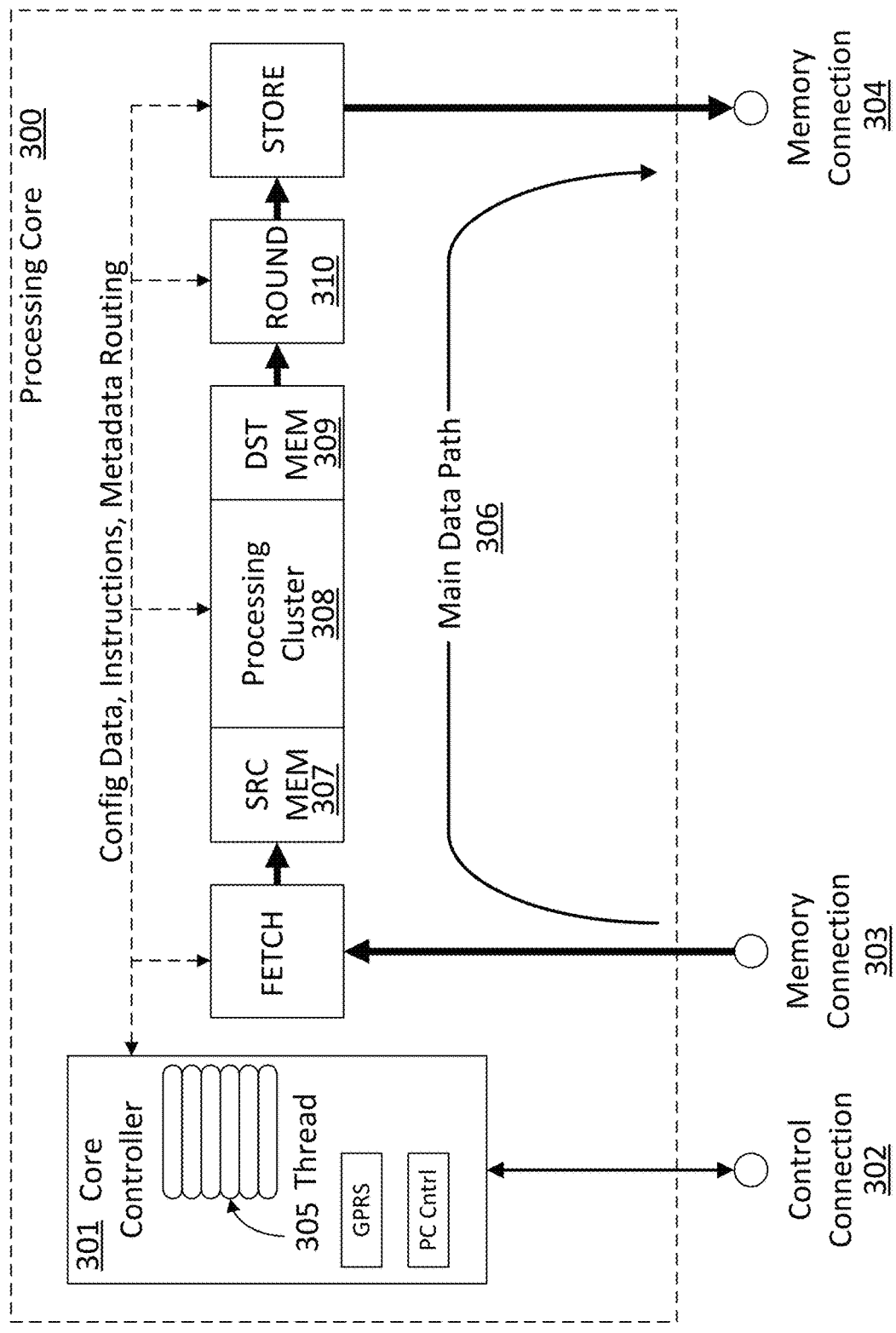
FIG. 3 is a block diagram of a processing core that is in accordance with specific embodiments of the present invention.

Processing core 300 in FIG. 3 can be used to describe the operation of specific embodiments of the invention. The processing core includes a core controller 301, a control connection 302, and at least two memory connections 303 and 304. The memory can be an external cache memory such that the memory connections are cache memory connections. The controller can be an external controller such that the control connection is an external controller connection. The core controller 301 can receive instructions via the control connection 302. The instructions can include input data and the identification of a kernel. For example, during the execution of an ANN in response to a set of input data "input_1" and having a first layer of weights "weight_layer_1," the control connection could receive an instruction in the form of: {conv, input_1, weights_layer_1}. Input data that is supplied to the input of a directed graph can be referred to herein as input directed graph data, where the set of input data "input_1" is a set of input directed graph data including multiple entries of directed graph data with particular values. The kernel for a convolution operation "cony" can then be accessed from an external memory by the core controller and used to form the instruction thread 305 for the processing core. Here "cony" refers to a convolution between input_1 and weights_layer_1 and serves as the kernel identifier for the kernel that will execute the convolution operation. The instruction can include the address of input_1 and weights_layer_1 in a memory or it can include the values themselves. The instructions could thereby involve a convolution between the input data to an ANN and the first layer of data that comprises the network. The thread 305 can then be used to administrate the main data path 306 of the processing core to execute that convolution. In this example, the thread 305 will result in the value output_layer_1 being generated by the main data path 306 and stored in a cache memory.

The main data path 306 of the processing core can involve fetching data from a memory connection 303, loading it into the source memory 307 of a processing cluster 308, conducting the processing, and storing the output in a destination memory. The source memory 307 and destination memory 309 can be registers that are integrated with the processing cluster. The memory from which the input data is retrieved and the output data is stored could be the same memory and could be an external cache memory that is amenable to random access. The processing cluster 308 can comprise the main computational units of the processing core. Examples of such computational units include arithmetic logic units (ALUs) and other logic blocks. As used herein, the term "ALU" is meant to refer to circuit blocks that operate on fixed point data elements as well as floating point units (FPUs) that operated on floating point data elements. In keeping with the example in the prior paragraph, the values for input_1 and weights_layer_1 could be retrieved from memory and the component values of those vectors could be provided to the processing cluster 308 in accordance with the instruction thread 305. The connection between the core controller 301 and the circuit blocks of the main data path 306 can involve the provisioning of configuration data to the configuration registers of each block, the provisioning of instructions for computations, and the routing of metadata from and to the core controller 301 as will be described below. The output of the convolution of the input_1 and weight_layer_1 which we can refer to as output_layer_1 can then be stored in memory.

Processing core 300 includes a rounding block 310 that is downstream from the processing cluster 308 on the main data path 306. The rounding block 310 can be configured to round specific values from the destination memory 309. The rounding can be conducted according to a data associative rounding scheme. The values can be round down to zero. The values could alternatively be rounded to the nearest whole number, to one, to negative one, or to any other value or set of values that will simplify further downstream computations while maintaining the fidelity of the data path to an acceptable degree. In the context of a directed graph that instantiates an ANN, maintaining fidelity to an "acceptable degree" involves assuring that the same inference is generated by the ANN as would have been with data associative rounding disabled. In a specific embodiment of the invention, a subset of values generated during the execution of one layer of a directed graph will be rounded to zero to simplify further computations involved in the execution of subsequent layers of the directed graph.

In specific embodiments of the invention, a rounding block, such as rounding block 310, can include a rounding circuit. The rounding circuit can include a comparator and round values based on a comparison produced by the comparator. The comparison can be a Boolean value and the value can be rounded to zero if the Boolean is true. The rounding block can apply a threshold and a value to the comparator to generate the comparison. The rounding block can round the value provided to the comparator based on the comparison. In specific embodiments of the invention, the specific threshold utilized by the rounding block can be associated with the data that is being evaluated. In keeping with the example above of a processing core executing a thread for the instruction {conv, input_1, weights_layer_1} the threshold could be associated with either the input_1 data structure or the weights_layer_1 data structure and could be applied to the rounding block to determine if the values in output_layer_1 should be rounded prior to storing output_layer_1 in memory. The association managed by the processing core could be with the data structure itself and not the values within the data structure. In other words, the same associated threshold could be applied to the rounding block whenever input data was provided to a given directed graph instantiated by the processing core, as opposed to whenever specific values were provided to the processing core.

In specific embodiments of the invention, the association between directed graph data and thresholds can take on numerous forms. The association can be between different units of directed graph data. For example, a single threshold can be associated with a data structure that holds a single data value, a data structure comprising a set of related data values within a vector or other tensor, a single plane of a multidimensional data structure, an entire tensor, a data tile used to hold one or more elements of directed graph data, an entire layer of a directed graph, or an entire graph. The association can also be between different types of directed graph data. For example, a single threshold can be associated with input data to the graph, an edge or node of the directed graph, or the output of the directed graph. In the example of a directed graph used to instantiate an ANN, the association can be with accumulation values, weight values, filter values, bias values, output values, input values, or any other data structure used or produced during the generation of an inference from the network. As will be apparent from examples below, the association between a threshold and a data structure can be an association with an operand to a computation while the rounding using the threshold is conducted on the output of that computation, or it can be an association between the output of the computation directly. In other words, an association can cause the processing core to apply a given threshold to round the output of any computation using a data structure or to any computation which produces the values for the data structure during an inference.

In specific embodiments of the invention, the thresholds can be provided to the processing core in various ways. For example, the thresholds could be provided programmatically to the processing core via an external controller. Once set, the threshold can be referred to as a programmatically selected threshold. The external controller and processing core could be configured to allow for the designation of associations between data structures and thresholds at the level of human readable source code to be compiled and implemented in the processing core as programmatically selected associations. Likewise, they could be configured to allow for the value of the thresholds, or equations used to derive those values, to be specified at the level of human readable source code to be compiled and implemented in the processing core as programmatically selected thresholds. The external controller could be a RISC controller able to receive PC commands that specify the associations and thresholds. The external controller could also provide the association in the form of an identification of the data to which the threshold should be associated. Alternatively, the external controller could store the threshold at a location in memory that the processing core had assigned to be related to a given unit of directed graph data such that the association was an inherent feature of the processor and the association was set by the external controller when loading a data value into that particular address. The thresholds could be stored in the memory of the core controller onboard the processing core, such as core controller 301, or in an external cache memory available to the processing core. The external cache memory could be a random-access memory. The thresholds can also be stored in a metadata header along with the data structures to which they are associated. The processing core can thereby be configured to obtain the threshold as part of the ordinary course of obtaining values from the data structure with slight additional modifications to account for accessing threshold values from the header of the structure. For example, a data structure associated with input_data_1 could include a header, and a threshold to be applied to any computation in which input_data_1 was used could be stored in that header. As such, whenever input_data_1 was recalled from memory, the required threshold would also be retrieved as it was located in the packet header used to identify and recall the required values from memory.

The thresholds can take on various forms. The thresholds could be fixed numbers that are programmatically configured via an external controller. For example, an external controller could set a threshold of "100" and any value below "100" associated with the threshold could be rounded. The thresholds could also be adaptively derived based on the data values in the directed graph data structures. In these cases, the equations used to derive the threshold values could be programmatically configured via an external controller. For example, an external controller could set a value of "60" and the processing core would internally derive a threshold according to a series of equations based on a design which set the threshold to 60% of the maximum value of a set of data values. Alternatively, or in combination, the entirety, or a portion, of these equations could be configured in hardware on the rounding block. For example, a set of values provided from the destination memory of the core computation block could be evaluated by a series of logic gates to produce an average value of the set of values to be used as the threshold or be used to calculate the threshold. The rounding block could include different series of logic gates that could be programmatically applied to different data structures according to the associations.

In specific embodiments of the invention, thresholds can be adaptively derived to round values that are relatively insignificant with respect to the other values in the same unit of directed graph data. For example, the threshold could be derived as a programmatically defined fraction of the largest value in a set of data values in a given data structure (e.g., ¼ of the largest value in a vector of accumulation values produced during the execution of an ANN). These approaches can exhibit certain benefits when applied to the execution of ANNs in that the larger value in some data structures will dominate the effect of the smaller values in generating the inference. The equations used to derive a threshold can be more complex and can involve finding the maximum, mode, mean, median, or minimum in a given data structure. The equations can also involve determining a standard deviation of the data values, analyzing a histogram of the values, and conducting complex statistical analyses on the data values. The equations used to derive the threshold values and conduct these intermittent analyses can be programmatically defined, associated with a kernel accessible to the processing core, and/or implemented directly in hardware in the rounding block of the processing core.

In specific embodiments of the invention, thresholds can be adaptively derived to round values that are relatively insignificant with respect to the other values in a different unit of directed graph data. The relationship between these different units of directed graph data can also be programmatically defined as can the equation used to derive the threshold therefrom. For example, a threshold for the values in the outputs from layer two of a CNN can be set to ½ of the average filter values used to compute the outputs of layer two of the CNN.

In specific embodiments of the invention, the thresholds can be provided with reference to a particular aspect of a data value as opposed to its absolute logical value. Approaches in accordance with these embodiments exhibit certain benefits in terms of the efficiency of conducting the comparison between the threshold and the data value. For example, the threshold could be provided or derived with reference to the exponent value of a floating-point number in approaches in which the data values are stored as floating-point numbers. As such, the threshold could be a set number such as "8" and the comparison would involve a basic compare operation between the integer value "8" and the value stored in the exponent bits of the floating-point number. The benefit of this approach is that the entire data value does not need to be analyzed by the system and can indeed be entirely neglected. For example, the mantissa of a floating-point number does not need to be analyzed. At the same time, the exponent provides a good source of information concerning the relative impact that different data values may have on the execution of a directed graph such that in certain applications rounding by exponents can achieve the benefit of maintaining the fidelity of the execution of the directed graph while also minimizing the computational resource consumption of the execution.

The associations between data and thresholds can be applied during computation in various ways. For example, the core controller can store the thresholds in the instruction thread and apply the thresholds to a configuration register of the rounding block at the time the associated data values are being delivered from the destination memory of the processing cluster. In this sense, the association is applied via the timing of the main data path as orchestrated by the instruction thread. In these approaches, the threshold may be stored as a data value in the instruction thread and could be provided in unmodified form from the thread controller to a comparator in the rounding block when the data values to which it is being applied are delivered to an alternative input to the comparator. As another example, the threshold could be stored in memory for an entire data structure or subset thereof. The data structure could include a portion of directed graph data. The threshold value, or values, could then be pre-programmed by the core controller block before data is moved from the FPU cluster output and remain stable until data movement completed. The core controller could program one threshold for all the math results conducted, or it could be updated for each data structure or subset thereof.

In specific embodiments of the invention, rounding can be conducted at various points in a main data path. As illustrated in FIG. 3, rounding occurs in rounding block 310 immediately after the values are obtained from the computation cluster. Alternatively, a similar approach could be applied to round the values just prior to being provided to the main computation cluster, instead of just after as in FIG. 3. However, as described below, certain benefits accrue to approaches in which the values are rounded prior to storage as opposed to being stored in unrounded form and then rounded when they are recalled for use later.

The appropriate thresholds and associations can be selected to improve the efficiency of the processing core while maintaining the accuracy of an execution of the directed graph at an "acceptable level." The appropriate thresholds and associations can be determined after a processing core is configured to execute a directed graph by feeding the directed graph with sets of input data that are tagged with the appropriate inference that should be generated by the directed graph. The training data can be used to modify the thresholds using a supervised machine learning approach. The thresholds and associations can be selected or solved for using any kind of iterative evaluation using known techniques for supervised learning. For example, the training data can be used to train a regression classifier which will be trained to determine a set of thresholds for the directed graph. In contrast to certain applications where obtaining large volumes of tagged input data is difficult, the processing core can generate its own training data by deactivating the rounding operation of the rounding block. The processing core can be placed in this state using a command provided by an external controller. The core can then either be fed a series of input data for which the "correct" outputs are derived from the execution of the directed graph. The inputs and derived outputs can then be combined to form a training data set. The obtained training data can then be used to set the thresholds and associations. Alternatively, the processing core can generate its training data in situ as the state of the processing core is continually switched between having rounding activated and deactivated while the processing core is being asked to execute new input data (i.e., tagged training data can be harvested while the processing core is operational and the rounding feature is turned off).

Figure 4:
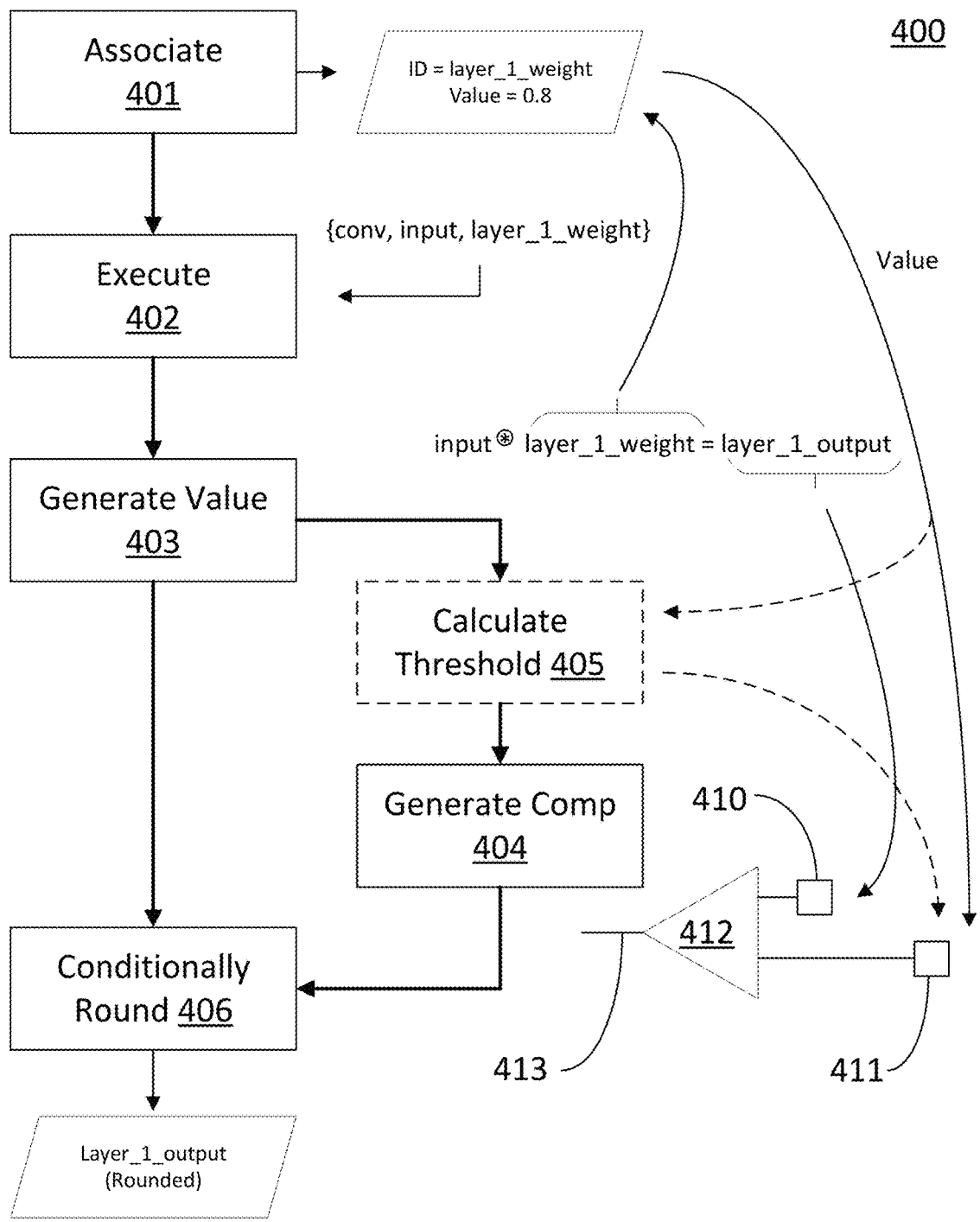
FIG. 4 is a flow chart of a method for executing a directed graph using a processing core that is in accordance with specific embodiments of the present invention.

FIG. 4 provides a flow chart 400 of a set of methods for executing a directed graph on a processing core. The flow chart beings with a step 401 of associating a threshold with a unit of directed graph data. The step is illustrated by a data link between the identification of a layer of weights of an ANN "layer_1_weight" and a fixed value of 0.8. As mentioned above, the value 0.8 can either be the threshold itself or can be a value used to derive a threshold later. The step can be conducted by a means for associating including an external controller, a cache memory, and a core controller on the processing core.

The flow chart continues with a step 402 of executing the directed graph. Step 402 can involve executing a single-instruction involved with the execution of the entire directed graph. As illustrated, the instruction can be for a single convolution operation between an input to the directed graph and a layer of weights in the directed graph. The flow chart continues with a step 403 in which a value is generated using a unit of directed graph data. Step 403 can essentially be a sub-step of step 402 such that it is conducted as part of the instruction execution. In this case, the two units of directed graph data are "input" and "layer_1_weight" and the operation involves the convolution of the values of that directed graph data to produce the values for "layer_1_output." Step 403 can be conducted by a means for generating a value such as the main computational cluster of the processing core under control of the core controller using operands obtained from a cache memory.

The flow chart continues with a step 404 in which a comparison value is generated. This step can involve the delivery of the output of step 403 and a threshold to the inputs of a comparator to produce a comparison on the output of that comparator. In a processing core, this can involve the delivery of directed graph data to a data register 410 and the delivery of a threshold to a threshold register 411. The data can be kept temporarily in these registers until it is time to execute the comparison using a comparator 412 with access to those registers. The timing can be conducted by a controller of the processing core, such as core controller 301, to assure that the comparator output 413 provided at any given time relates to the data currently being held for a potential rounding operation by the rounding circuit of the processing core, such as the rounding circuit in rounding block 310. As illustrated, the threshold was associated with the operands used in step 403 and the associated threshold value is delivered to the comparator to be used in a comparison with the output of the operation in step 403. However, as mentioned previously, the threshold could have alternatively been associated with the output data structure for which step 403 generated a value. Regardless, the value for the unit of directed graph data generated in step 403 will be provided to a comparator at the same time the associated threshold is provided to the comparator. Step 404 can be executed by a means for generating a comparison such as a comparator and a set of control elements that coordinate the delivery of the required values thereto including the core controller of the processing core. In specific approaches, the unit of directed graph data provided to the comparator is a portion of the operand or output of step 403. For example, the unit of directed graph data could be an exponent of a fixed-point data value which was used or generated in step 403.

The flow chart contains an optional step 405 in which a threshold is calculated. The threshold could be calculated based on the data values used or generated in step 403 and a prestored value. Variations of this approach are described above. In addition, the illustrated value of 0.8 might not be a fixed value but instead may be an equation or algorithm that does not depend on the execution of step 403 as does step 405. As mentioned previously, the threshold can be derived from the values in data structures that are not involved in the current or recent actions of the processing unit. As such, step 405 can independently feed into step 404 as opposed to linking thereto from step 403. The threshold can be generated using a set of entries in a data structure. Step 405 can be executed by a means for generating a threshold value such as the series of logic gates that are coupled to the destination memory of a processing cluster of the processing core referenced above and/or an external controller and a cache memory.

The flow chart continues with a step 406 in which a value is conditionally rounded based on the comparison generated in step 404. The rounding can be conducted by a rounding circuit block that is configured to provide a rounded value in place of an original value. The rounding circuit can be in the main data pipeline of the processing core as shown in FIG. 3. The means for rounding can include a rounding block, such as rounding block 310, and retrieve a value from a hardware memory, modify a received value, or link a particular circuit node to either ground or power to execute a rounding operation, where an input to the block is the value from step 403 as an input and the comparison from step 404 as a control signal.

FIGS. 5-8 are functional block diagrams that provide examples of the specific methods enabled and disclosed in FIG. 4. Block diagram 500 illustrates an association 501 formed between a unit of input directed graph data "Z" and a threshold "TH." The association and values for Z and TH can all be available ex ante to the flow illustrated by block diagram 500. Association 501 can take on any of the forms disclosed herein and can be created using any of the approaches disclosed herein. A controller of a processing core can utilize association 501 to assure that the value for TH is made available in threshold register 502 at the same time the value for Z is made available in data register 503. The two values can then be compared using a comparator 504 in rounding block 505. The comparator output 510 of the comparator 504 can then be used to control the operation of a rounding circuit 506 in rounding block 505. As a result, the product of a computation involving values X and Y, as produced using computation unit 507, will be conditionally rounded based on the prestored association 501 and the value TH. The association 501 is therefore used so that the threshold is applied whenever the value for the associated data structure is computed. With reference back to FIG. 3, rounding block 505 can serve in place of rounding block 310, computation unit 507 can serve as part of processing cluster 308, and the input data registers 508 and 509 can be part of source memory 307.

Figure 5:
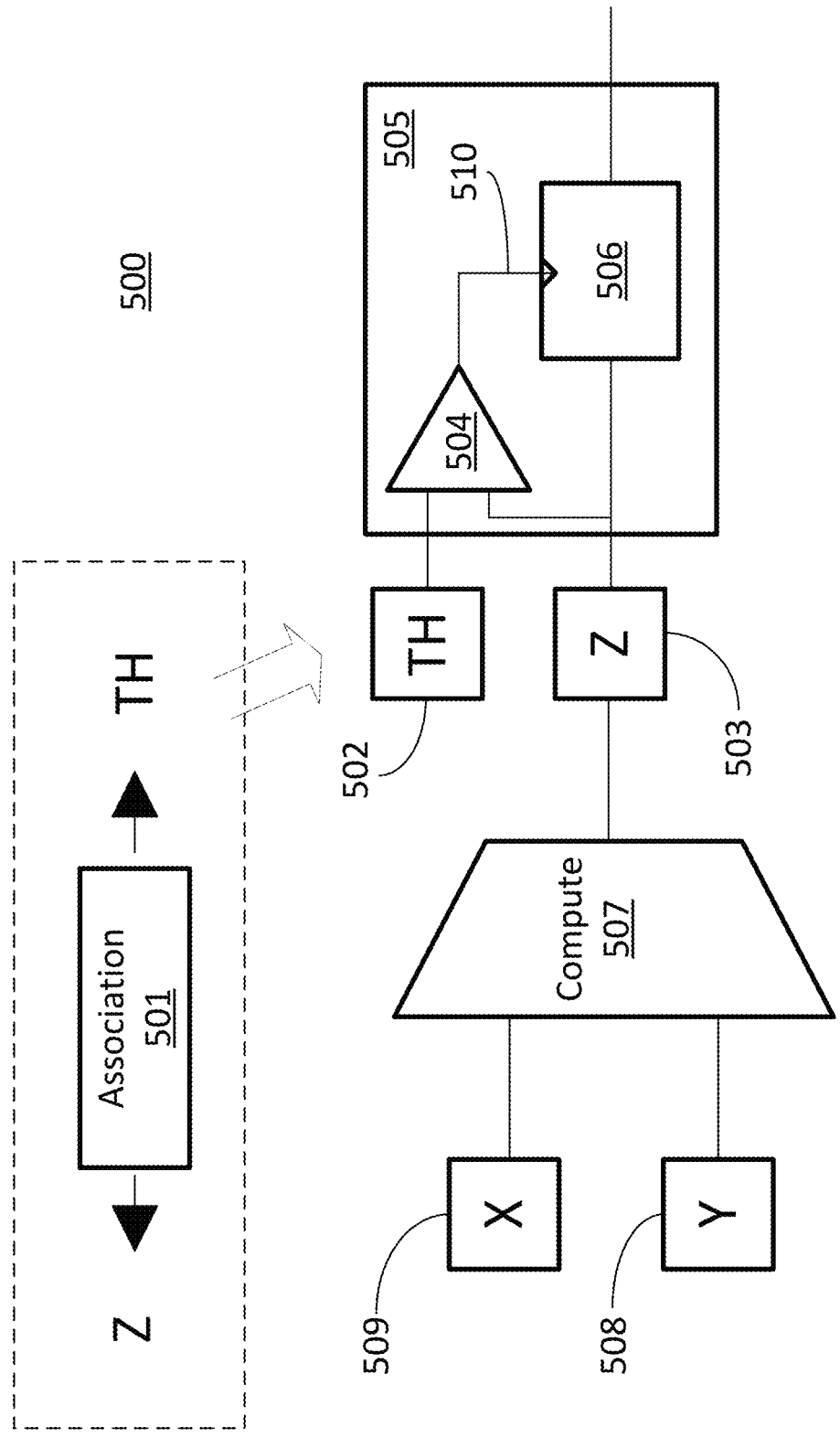
FIG. 5 is a functional block diagram for implementing specific methods disclosed in FIG. 4 using an association between directed graph data and a threshold.
Figure 6:
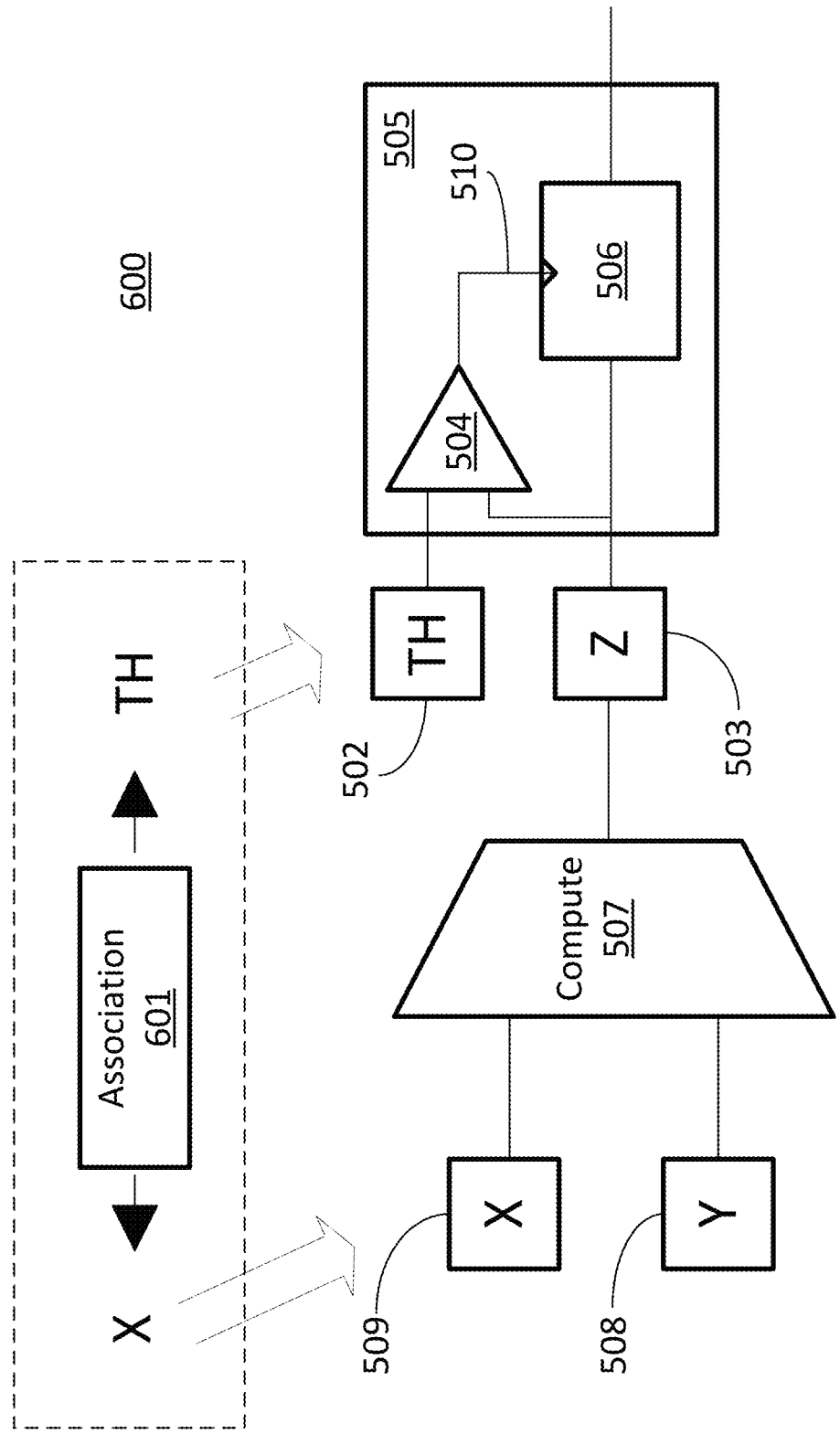
FIG. 6 is a functional block diagram for implementing specific methods disclosed in FIG. 4 using an association between input directed graph data and a threshold.

FIG. 6 is a functional block diagram for implementing specific methods disclosed in FIG. 4 using an association between input directed graph data and a threshold. Block diagram 600 illustrates an association 601 formed between a unit of input directed graph data "X" and a threshold "TH." The association and values for X and TH can all be available ex ante to the flow illustrated by block diagram 600. Association 601 can take on any of the forms disclosed herein and can be created using any of the approaches disclosed herein. A controller of a processing core can utilize association 601 to assure that the value for TH is made available in threshold register 502 at the same time the value for Z is made available in data register 503. The association 601 is therefore used differently than the association 501 in that the threshold is applied whenever the input directed graph data X is used as an input to a computation and is used to round the output of that computation. While differing in this regard, FIGS. 5 and 6 are similar in that the threshold is not independently calculated (i.e., the optional step of calculating the threshold 405 in FIG. 4 is not utilized in block diagrams 500 and 600). In contrast, FIGS. 7 and 8 illustrate approaches in which step 405 is required to compute the threshold.

Figure 7:
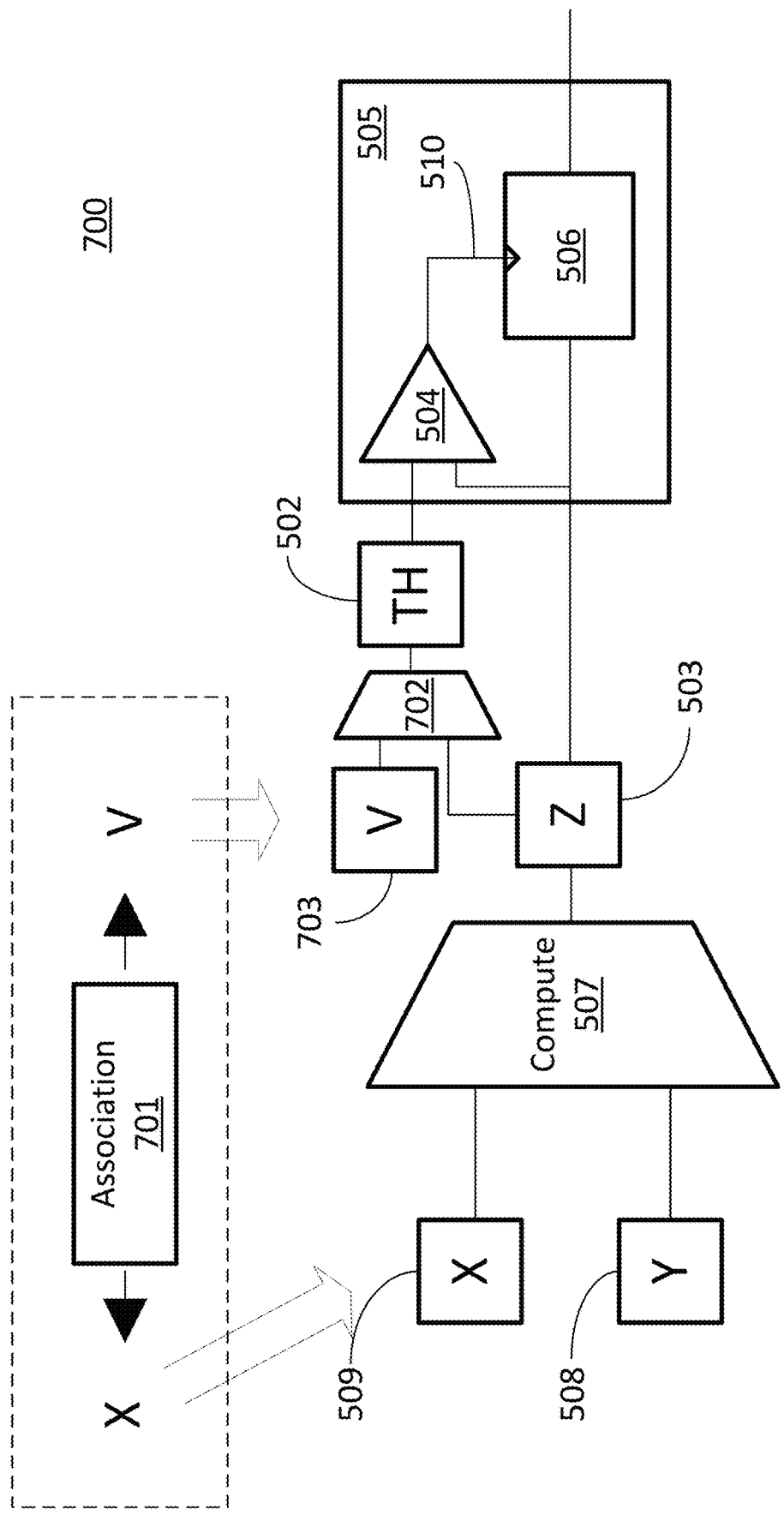
FIG. 7 is a functional block diagram for implementing specific methods disclosed in FIG. 4 using an association between input directed graph data and a value used to calculate a threshold using that same directed graph data.

FIG. 7 is a functional block diagram for implementing specific methods disclosed in FIG. 4 using an association between input directed graph data and a value for calculating a threshold. Block diagram 700 illustrates an association 701 formed between a unit of input directed graph data "X" and a value "V." Block diagram 700 includes an execution of step 405 in FIG. 4 in that the threshold is not a prestored value. Instead, as illustrated, the value for data structure V is loaded into a register 703 and is used along with the value for data structure Z by computation block 702 to calculate a threshold value for data structure TH. The form of computation block 702 will depend upon the specific manner in which the threshold value is calculated. For example, the computation could involve a histogram of the values in data structure Z or a more basic calculation such as dividing the largest value in data structure Z in half, and the complexity of computation block 702 will be set to accommodate that calculation. The calculated value, as computed by computation block 702, is then stored in threshold register 502. The value for TH is then used to conditionally round the value of data structure Z using an approach similar to that of FIGS. 5 and 6. The association and values for X and V can all be available ex ante to the flow illustrated by block diagram 700. Association 701 can take on any of the forms disclosed herein and can be created using any of the approaches disclosed herein. A controller of a processing core can utilize association 701 to assure that the calculated value for TH is made available in threshold register 502 at the same time the value for Z is made available in data register 503. The association 701 is therefore used to assure that a customized rounding value based on the value of the output data Z is used to round the output data where the customized rounding is set by a value associated with input data X which is used to compute the value for data structure Z. In other embodiments of the invention, association 701 could instead have been between data structure Z and data structure V while the flow diagram would otherwise be the same as that illustrated in FIG. 7.

Figure 8:
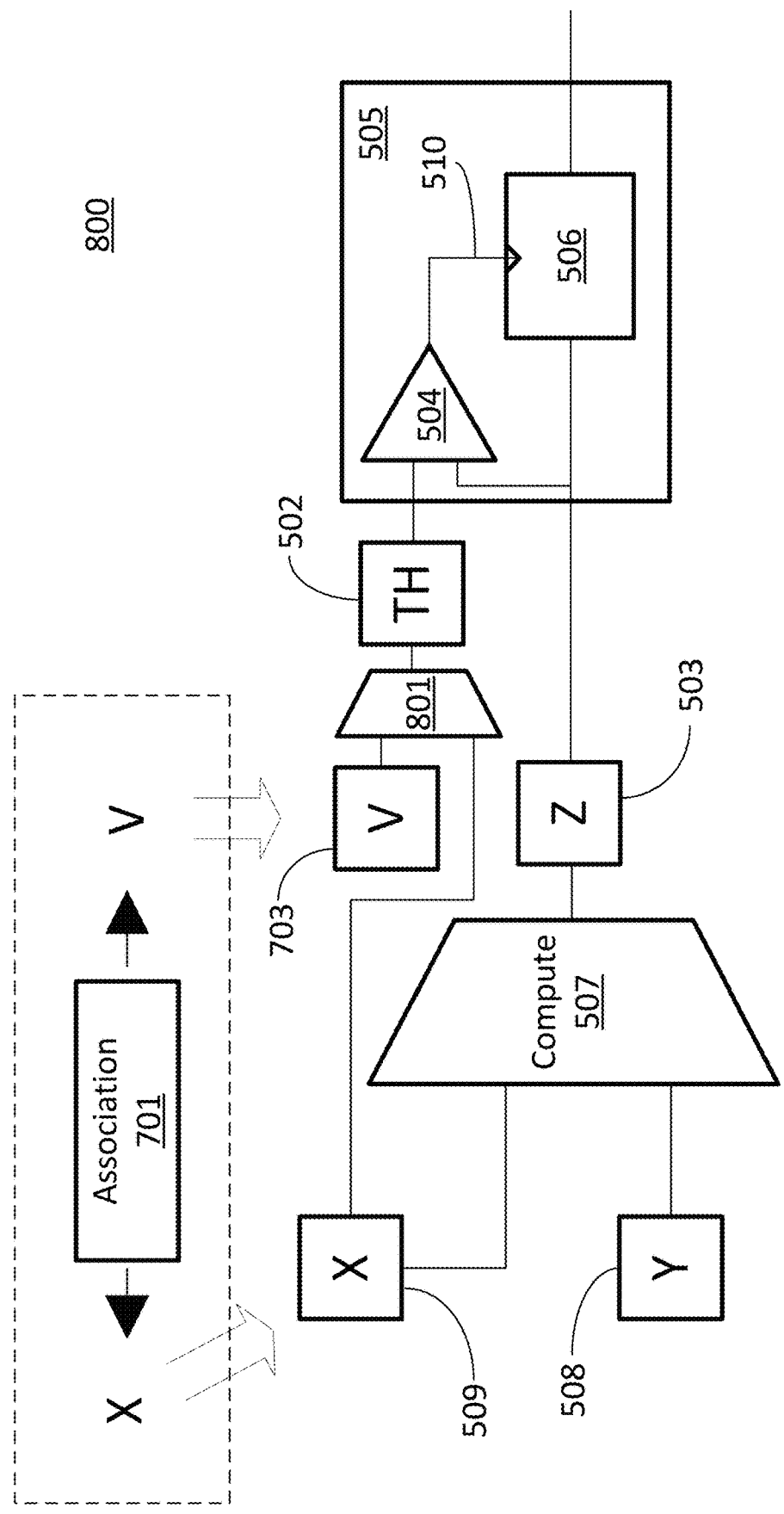
FIG. 8 is a functional block diagram for implementing specific methods disclosed in FIG. 4 using an association between input directed graph data and a threshold.

FIG. 8 is a functional block diagram for implementing specific methods disclosed in FIG. 4 using an association between input directed graph data and a threshold. Block diagram 800 utilizes the same association 701 formed between a unit of input directed graph data "X" and a value "V" as in FIG. 7. Furthermore, FIG. 8 can be modified in the same manner as FIG. 7 such that the association could have been between data structure Z and data structure V while the flow diagram would otherwise be the same as that illustrated in FIG. 8. Block diagram 800 includes an execution of step 405 in FIG. 4 in that the threshold is not a prestored value. Instead, as illustrated, the value for data structure V is loaded into a register 703 and is used along with the value for data structure X by a computation block 801 to calculate a threshold value for data structure TH. This is different than the approach in FIG. 7 in that the input data to the computation is used to calculate the threshold as opposed to the output data. The form of computation block 801 will depend upon the specific manner in which the threshold value is calculated as in the example of computation block 702. The calculated value is then stored in threshold register 502. The value for TH is then used to conditionally round the value of data structure Z using an approach similar to that of FIGS. 5 and 6. The association and values for X and V can all be available ex ante to the flow illustrated by block diagram 700. A controller of a processing core can utilize association 701 to assure that the calculated value for TH is made available in threshold register 502 at the same time the value for Z is made available in data register 503. The association 701 is therefore used to assure that a customized rounding value based on the value of the unit of directed graph data X is used to round the output data.

Figure 9:
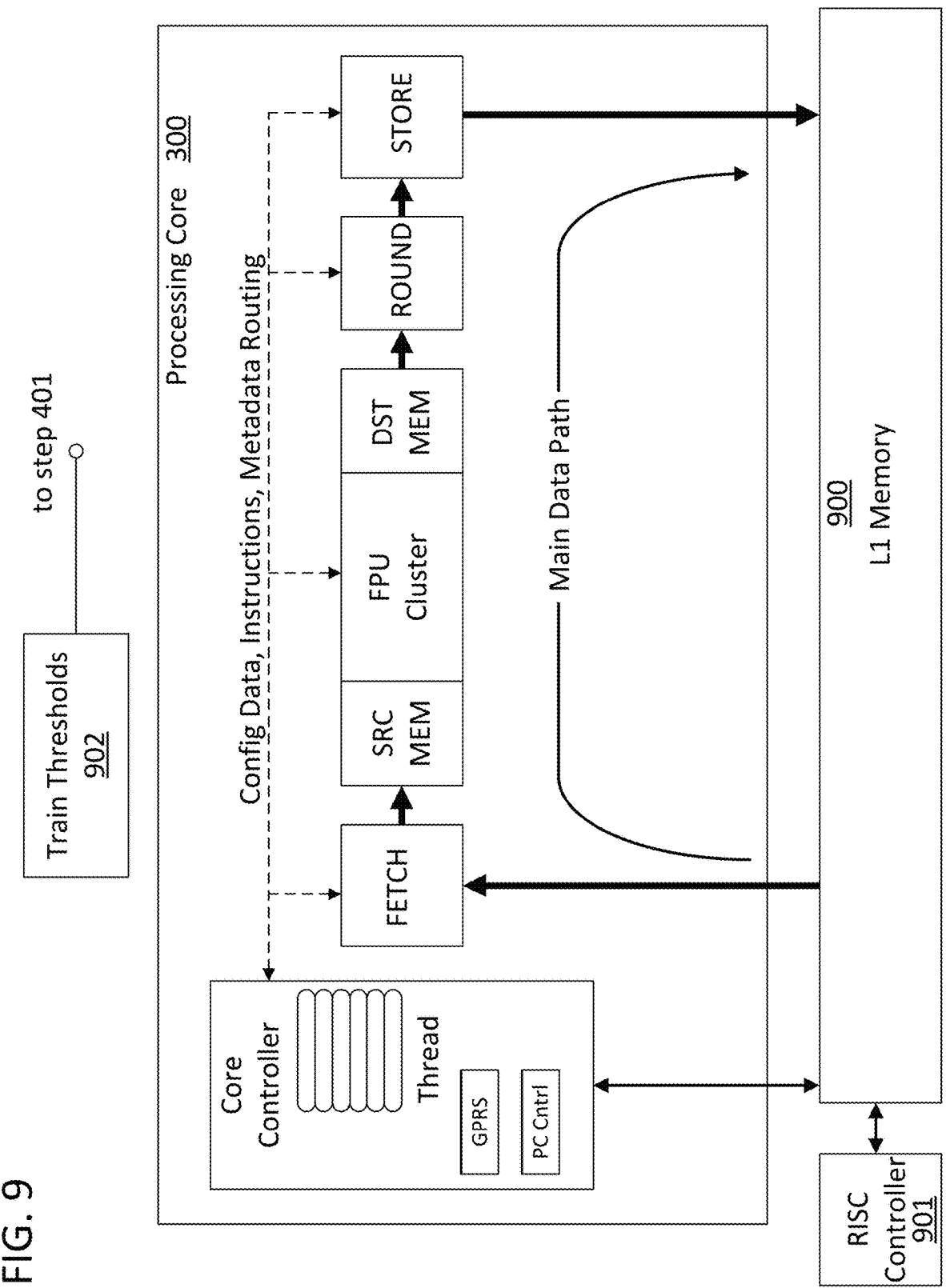
FIG. 9 is a block diagram of a processing core connected to an external controller and a cache memory that is in accordance with specific embodiments of the present invention.

FIG. 9 provides a block diagram of a processing core 300 that is connected to an external memory 900 and can receive control inputs from an external controller 901. In this configuration, the processing core can receive command inputs by accessing a known location in memory 900 into which the external controller 901 loads commands. The external memory 900 can store directed graph data for execution by the processing core along with kernels for conducting that execution, the associations and thresholds disclosed herein, and other data required for the processing core's operation. In the illustrated case, external memory 900 is an L1 cache memory and external controller 901 is a reduced instruction set (RISC) controller. However, other kinds of memory and controllers could serve the same purpose as the illustrated components. An external controller such as external controller 901 can execute any of the method steps disclosed herein requiring an external controller. A memory such as memory 900 can be involved in any of the method steps disclosed herein requiring an external memory. A higher-level PC controller can have a connection to external controller 901 and an optional directed connection to core controller 301. Memory 900 may be shared among multiple processing cores that cooperate to execute a directed graph in parallel.

FIG. 9 also illustrates flow diagram step 902 which can be a precursor step to step 401 in FIG. 4. Flow diagram step 902 involves an iterative machine learning technique for training the thresholds and associations required for the processing core 300 to optimize the execution of a directed graph. The training can be conducted via the PC controller mentioned above in combination with controller 901 and memory 900. The training can involve the provisioning of test inputs to the controller 901, and the ultimate programming of threshold values and associations to be stored in memory 900 and the configuration registers and other memory locations on processing core 300.

Figure 10:
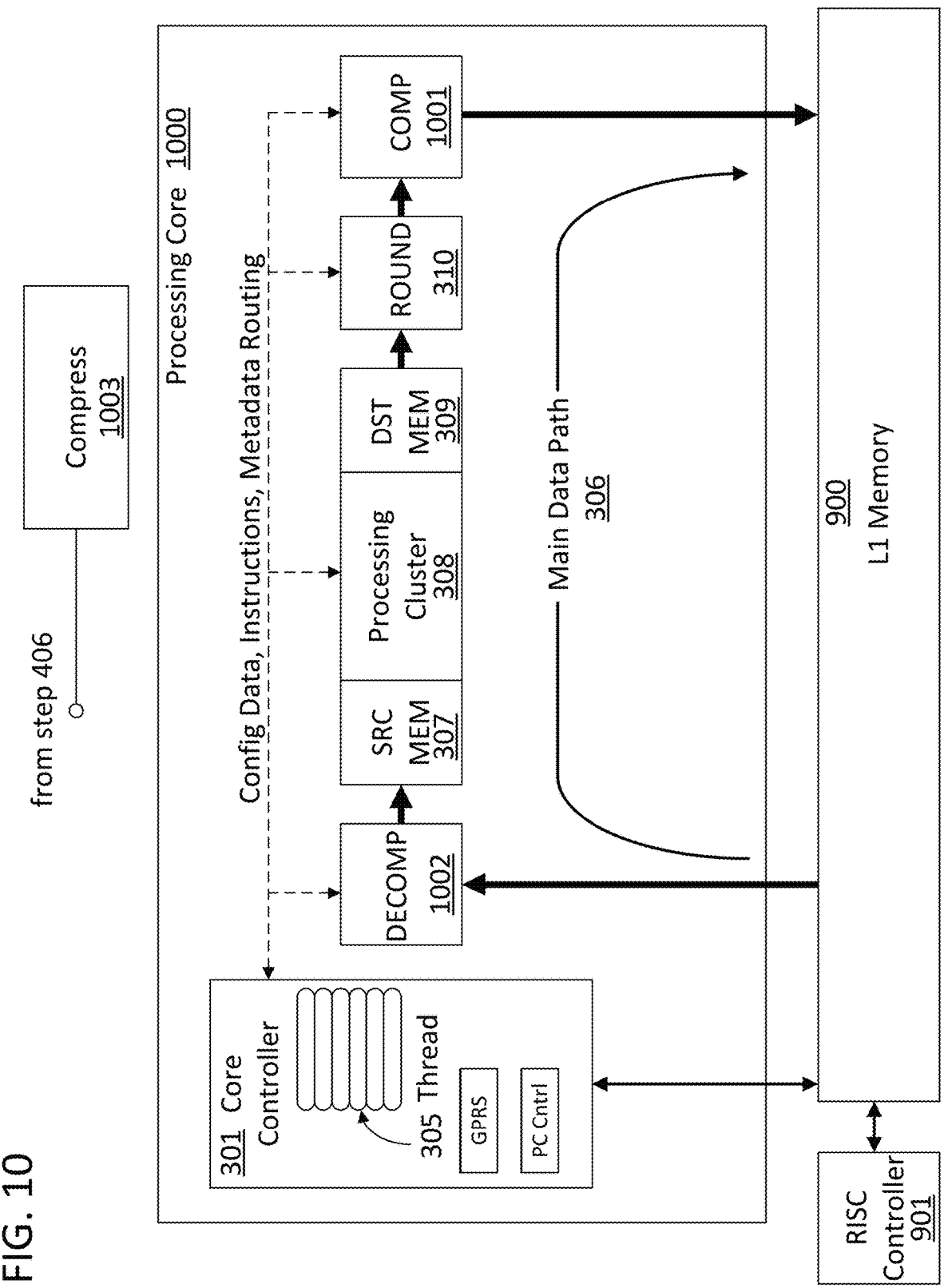
FIG. 10 is a block diagram of a processing core with an integrated compression and decompression system in the main data path that is in accordance with specific embodiments of the present invention.

FIG. 10 illustrates a processing core 1000 which includes decompression 1002 and compression 1001 blocks in the main data path. The decompression and compression blocks can limit the amount of processing and memory bandwidth resources that are consumed through the execution of a directed graph. The decompression and compression blocks can include compression circuits and decompression circuits for compressing binary data or execute compression at the scale of directed graph data values. In the case of a sparse directed graph, reducing the size of the data structures that need to be moved through the system can provide significant gains with relatively low overhead costs in terms of the execution of the compression and decompression. In particular, the compression block 1001 can utilize a run length style of encoding which changes long strings of the same value into a symbol representing the value and a symbol representing the length of the run (i.e., "00000000" can be compressed to "80" meaning 8 consecutive zeroes). Such an operation can be referred to as a run length compression. The values selected for the tracked runs in the run length encoding can beneficially be set to the values towards which the rounding circuit rounds the values. For example, if the compression system used a "0" run length encoding, then the rounding circuit would be configured to round near-zero values to 0 and favor rounding values for directed graph data structure that did not appear to have a dispositive effect on the execution of the directed graph to zero as well. The compression block 1001 can also be configured to encode run lengths of multiple values where the multiple values are selected based on which values the rounding block rounds to.

The flow chart also includes a flow chart step 1003 which can be executed following step 406 from FIG. 4. The benefit of executing the step in this order has been described immediately above in that the rounding will increase the run length and enhance the efficiency of the compression. Step 1003 can be conducted by a means for compressing such as the compression block 1001 in FIG. 10. The compression block 1001 can include nonsparse value counters, reset circuits that reset the counters upon detecting a sparse value, and registers for storing the output of the counters when they are reset. The circuit elements could be configured to count a maximum number of consecutive non-sparse values to measure deltas of a given size. For example, the registers could be configured to store, the counters could be configured to count, and the reset circuits could be configured to automatically reset upon detecting, X-bits worth of sparse values. Specifically, the deltas could be less than X to the power of two sparse values.

Figure 11:
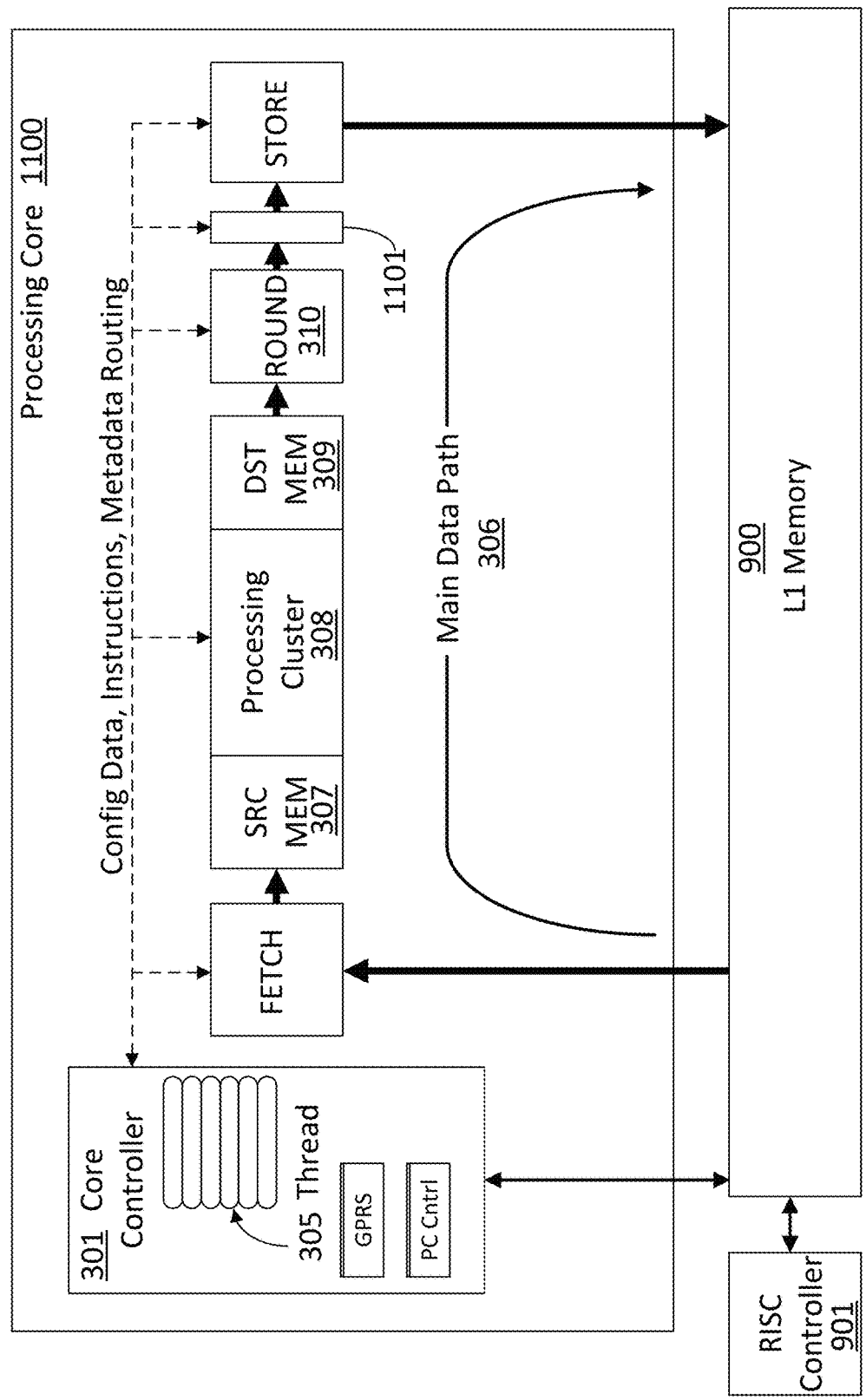
FIG. 11 is a block diagram of a processing core with an integrated metadata generator in the main data path that is in accordance with specific embodiments of the present invention.

FIG. 11 illustrates a processing core 1100 which includes a metadata generation block 1101 in the main data path 306. The metadata generation block 1101 can evaluate the output of the main computational cluster and generate metadata that is reflective of the values in that output. The metadata generation block 1101 can be a metadata generator circuit which evaluates the output of the rounding block using sequential logic and stored values for comparison. The metadata generator circuit can include configuration registers for receiving commands or other configuration information from the processing core controller. The metadata can then be associated with the data structure that will store that output using the core controller and/or a header of the data structure in which the output is stored. In particular, the metadata generation block 1101 can generate data that is used by the rounding block, or other circuitry, to derive the appropriate threshold for a unit of directed graph data. For example, as mentioned previously, the threshold may be generated based on a histogram or standard deviation of the values in the data structure, and such information can be produced by the metadata generation block 1101. Alternatively, or in combination, the metadata generation block can generate data indicative of how sparse the output data from the computational cluster is. For example, metadata generation block 1101 can generate a zero flag to be associated with the data structure if all of the values in the data structure are zero. This flag can then be used at a later time to suppress computation using the data structure in which the fact that all of the values are zero is dispositive. As such, connecting metadata generation block 1101 to the output of the rounding block in the main data path produces significant benefits because it will generate more zero flags and further increase the efficiency of the execution of a directed graph using the processing core.

The flow chart also includes a flow chart step 1102 which can be executed following step 406 from FIG. 4. The benefit of executing the step in this order has been described immediately above in that the rounding may increase the number of zero flags or other metadata based on sparsity or repetition that is then used to increase the efficiency of computation using the associated data structure. Step 1102 can be conducted by a means for generating a zero flag such as metadata generator block 1101 in FIG. 11. The metadata generator block 1101 could include comparators, logic gates, and output registers. The comparators could evaluate a set of values from the rounding block against a fixed value such as zero. The logic gates could then generate a zero flag if a set of evaluated values from the rounding block were zero. The output registers could then hold the zero flag, potentially along with multiple other zero flags, such that the zero flags can ultimately be read and associated with the data that was evaluated by the comparators.

While the specification has been described in detail with respect to specific embodiments of the invention, it will be appreciated that those skilled in the art, upon attaining an understanding of the foregoing, may readily conceive of alterations to, variations of, and equivalents to these embodiments. Although examples in the disclosure where generally directed to processing core executing a convolution instruction, the same approaches could be utilized to simplify the execution of any composite calculation or composite logic operation including sum-of-products calculations. These and other modifications and variations to the present invention may be practiced by those skilled in the art, without departing from the scope of the present invention, which is more particularly set forth in the appended claims.

What is claimed is:

1. A processing core, comprising:
   a processing cluster configured to generate a value for a unit of directed graph data using input directed graph data;
   a core controller configured to load a threshold value into a threshold register when the value for the unit of directed graph data is loaded into a data register;
   a comparator coupled to the threshold register and the data register and configured to generate a comparator output based on: (i) the threshold value in the threshold register; and (ii) the value for the unit of directed graph data in the data register;
   a rounding circuit: (i) configured to receive the value for the unit of directed graph data from the processing cluster; and (ii) configured to conditionally round the value for the unit of directed graph data based on the comparator output from the comparator; and
   a control connection for an external controller;
   wherein the core controller is configured to: (i) receive a programmatically selected threshold from the control connection; and (ii) store the programmatically selected threshold as the threshold value.

2. The processing core of claim 1, wherein the core controller is configured to:
   receive a programmatically selected association between the programmatically selected threshold and the unit of directed graph data from the control connection; and
   use the programmatically selected association to load the threshold value into the threshold register when the value for the unit of directed graph data is loaded into the data register.

3. A processing core, comprising:
   a processing cluster configured to generate a value for a unit of directed graph data using input directed graph data;
   a core controller configured to load a threshold value into a threshold register when the value for the unit of directed graph data is loaded into a data register;
   a comparator coupled to the threshold register and the data register and configured to generate a comparator output based on: (i) the threshold value in the threshold register; and (ii) the value for the unit of directed graph data in the data register; and
   a rounding circuit: (i) configured to receive the value for the unit of directed graph data from the processing cluster; and (ii) configured to conditionally round the value for the unit of directed graph data based on the comparator output from the comparator;
wherein:
the unit of directed graph data is a vector;
the value is one entry of a set of entries in the vector;
the rounding circuit is configured to calculate the threshold value using the set of entries in the vector; and
the core controller is configured to instruct the rounding circuit to calculate the threshold value.

4. The processing core of claim 3, further comprising:
a control connection for an external controller;
wherein the core controller is configured to receive a programmatically selected threshold from the control connection; and
wherein the core controller is configured to instruct the rounding circuit to calculate the threshold value using the programmatically selected threshold.

5. A processing core, comprising:
a processing cluster configured to generate a value for a unit of directed graph data using input directed graph data;
a core controller configured to load a threshold value into a threshold register when the value for the unit of directed graph data is loaded into a data register;
a comparator coupled to the threshold register and the data register and configured to generate a comparator output based on: (i) the threshold value in the threshold register; and (ii) the value for the unit of directed graph data in the data register; and
a rounding circuit: (i) configured to receive the value for the unit of directed graph data from the processing cluster; and (ii) configured to conditionally round the value for the unit of directed graph data based on the comparator output from the comparator;
wherein:
the unit of directed graph data is a vector with a set of entries;
the entries in the set of entries are stored as floating-point numbers in the processing core; and
the value is an exponent of one entry in the set of entries.

6. A processing core, comprising:
a processing cluster configured to generate a value for a unit of directed graph data using input directed graph data;
a core controller configured to load a threshold value into a threshold register when the value for the unit of directed graph data is loaded into a data register;
a comparator coupled to the threshold register and the data register and configured to generate a comparator output based on: (i) the threshold value in the threshold register; and (ii) the value for the unit of directed graph data in the data register;
a rounding circuit: (i) configured to receive the value for the unit of directed graph data from the processing cluster; and (ii) configured to conditionally round the value for the unit of directed graph data based on the comparator output from the comparator;
a cache memory connection; and
an external controller connection;
wherein the core controller is configured to receive a command from the external controller connection;
wherein the command includes an identifier for the unit of directed graph data, a set of input directed graph data, and a kernel identifier for a kernel; and
wherein the core controller is configured to retrieve the unit of directed graph data and the kernel from the cache memory connection upon receiving the command.

7. The processing core of claim 6, wherein:
the core controller is configured to retrieve the threshold value upon receiving the command.

8. A processing core, comprising:
a processing cluster configured to generate a value for a unit of directed graph data using input directed graph data;
a core controller configured to load a threshold value into a threshold register when the value for the unit of directed graph data is loaded into a data register;
a comparator coupled to the threshold register and the data register and configured to generate a comparator output based on: (i) the threshold value in the threshold register; and (ii) the value for the unit of directed graph data in the data register;
a rounding circuit: (i) configured to receive the value for the unit of directed graph data from the processing cluster; and (ii) configured to conditionally round the value for the unit of directed graph data based on the comparator output from the comparator;
a compression circuit operatively coupled to an output of the rounding circuit and configured to execute a run length compression on the unit of directed graph data; and
wherein the rounding circuit rounds the value for the unit of directed graph data to zero based on the comparator output from the comparator.

9. The processing core of claim 8, further comprising:
a control connection for an external controller; and
wherein the core controller is configured to: (i) receive a programmatically selected threshold from the control connection; and (ii) store the programmatically selected threshold as the threshold value.

10. The processing core of claim 9, wherein the core controller is configured to:
receive a programmatically selected association between the programmatically selected threshold and the unit of directed graph data from the control connection; and
use the programmatically selected association to load the threshold value into the threshold register when the value for the unit of directed graph data is loaded into the data register.

11. The processing core of claim 8, wherein:
the unit of directed graph data is a vector;
the value is one entry of a set of entries in the vector;
the rounding circuit is configured to calculate the threshold value using the set of entries in the vector; and
the core controller is configured to instruct the rounding circuit to calculate the threshold value.

12. The processing core of claim 11, further comprising:
a control connection for an external controller;
wherein the core controller is configured to receive a programmatically selected threshold from the control connection; and
wherein the core controller is configured to instruct the rounding circuit to calculate the threshold value using the programmatically selected threshold.

13. The processing core of claim 8, wherein:
the unit of directed graph data is a vector with a set of entries;
the entries in the set of entries are stored as floating-point numbers in the processing core; and
the value is an exponent of one entry in the set of entries.

14. The processing core of claim 8, further comprising:
a cache memory connection;
an external controller connection;
wherein the core controller is configured to receive a command from the external controller connection;
wherein the command includes an identifier for the unit of directed graph data, a set of input directed graph data, and a kernel identifier for a kernel; and
wherein the core controller is configured to retrieve the unit of directed graph data and the kernel from the cache memory connection upon receiving the command.

15. The processing core of claim 14, wherein:
the core controller is configured to retrieve the threshold value upon receiving the command.

16. The processing core of claim 8, further comprising:
a metadata generator circuit operatively coupled to an output of the rounding circuit and configured to generate a zero flag when all values in the unit of directed graph data are zero; and
wherein the rounding circuit rounds the value for the unit of directed graph to zero based on the comparator output from the comparator.

17. A processing core, comprising:
a processing cluster configured to generate a value for a unit of directed graph data using input directed graph data;
a core controller configured to load a threshold value into a threshold register when the value for the unit of directed graph data is loaded into a data register;
a comparator coupled to the threshold register and the data register and configured to generate a comparator output based on: (i) the threshold value in the threshold register; and (ii) the value for the unit of directed graph data in the data register;
a rounding circuit: (i) configured to receive the value for the unit of directed graph data from the processing cluster; and (ii) configured to conditionally round the value for the unit of directed graph data based on the comparator output from the comparator;
a metadata generator circuit operatively coupled to an output of the rounding circuit and configured to generate a zero flag when all values in the unit of directed graph data are zero; and
wherein the rounding circuit rounds the value for the unit of directed graph to zero based on the comparator output from the comparator.

18. The processing core of claim 17, further comprising:
a control connection for an external controller; and
wherein the core controller is configured to: (i) receive a programmatically selected threshold from the control connection; and (ii) store the programmatically selected threshold as the threshold value.

19. The processing core of claim 18, wherein the core controller is configured to:
receive a programmatically selected association between the programmatically selected threshold and the unit of directed graph data from the control connection; and
use the programmatically selected association to load the threshold value into the threshold register when the value for the unit of directed graph data is loaded into the data register.

20. The processing core of claim 17, wherein:
the unit of directed graph data is a vector;
the value is one entry of a set of entries in the vector;
the rounding circuit is configured to calculate the threshold value using the set of entries in the vector; and
the core controller is configured to instruct the rounding circuit to calculate the threshold value.

21. The processing core of claim 20, further comprising:
a control connection for an external controller;
wherein the core controller is configured to receive a programmatically selected threshold from the control connection; and
wherein the core controller is configured to instruct the rounding circuit to calculate the threshold value using the programmatically selected threshold.

22. The processing core of claim 17, wherein:
the unit of directed graph data is a vector with a set of entries;
the entries in the set of entries are stored as floating-point numbers in the processing core; and
the value is an exponent of one entry in the set of entries.

23. The processing core of claim 17, further comprising:
a cache memory connection;
an external controller connection;
wherein the core controller is configured to receive a command from the external controller connection;
wherein the command includes an identifier for the unit of directed graph data, a set of input directed graph data, and a kernel identifier for a kernel; and
wherein the core controller is configured to retrieve the unit of directed graph data and the kernel from the cache memory connection upon receiving the command.

24. The processing core of claim 23, wherein:
the core controller is configured to retrieve the threshold value upon receiving the command.

25. A method comprising:
associating, in a processing core, a threshold with a unit of directed graph data, the directed graph data being from a directed graph;
executing, using the processing core, the directed graph;
generating, while executing the directed graph and using a processing cluster in the processing core, a value for the unit of directed graph data;
generating a comparison of the value of the unit of directed graph data and the threshold;
conditionally rounding, based on the comparison and using a rounding circuit in the processing core, the value of the unit of directed graph data;
receiving the threshold on the processing core from an external controller; and
receiving an association between the unit of directed graph data and the threshold from the external controller;
wherein the associating, in the processing core, is conducted according to the association as received from the external controller.

26. A method comprising:
associating, in a processing core, a threshold with a unit of directed graph data, the directed graph data being from a directed graph;
executing, using the processing core, the directed graph;
generating, while executing the directed graph and using a processing cluster in the processing core, a value for the unit of directed graph data;
generating a comparison of the value of the unit of directed graph data and the threshold;
conditionally rounding, based on the comparison and using a rounding circuit in the processing core, the value of the unit of directed graph data; and compressing the unit of directed graph data, using a compression circuit, and after the rounding circuit has rounded the value of the unit of directed graph data;
wherein the compression circuit uses a run length encoding.

27. A method comprising:
associating, in a processing core, a threshold with a unit of directed graph data, the directed graph data being from a directed graph;
executing, using the processing core, the directed graph;
generating, while executing the directed graph and using a processing cluster in the processing core, a value for the unit of directed graph data;
generating a comparison of the value of the unit of directed graph data and the threshold;
conditionally rounding, based on the comparison and using a rounding circuit in the processing core, the value of the unit of directed graph data; and
generating, using a metadata generator circuit operatively coupled to an output of the processing cluster, a zero flag when all the values in the unit of directed graph data are zero; and
wherein the rounding circuit rounds the value to zero.

28. A method comprising:
associating, in a processing core, a threshold with a unit of directed graph data, the directed graph data being from a directed graph;
executing, using the processing core, the directed graph;
generating, while executing the directed graph and using a processing cluster in the processing core, a value for the unit of directed graph data;
generating a comparison of the value of the unit of directed graph data and the threshold;
conditionally rounding, based on the comparison and using a rounding circuit in the processing core, the value of the unit of directed graph data;
training a regression classifier using a set of input data for the directed graph, to determine a set of thresholds for the directed graph; and
receiving the set of thresholds on the processing core from an external controller;
wherein the set of thresholds include the threshold.

29. A method comprising:
associating, in a processing core, a threshold with a unit of directed graph data, the directed graph data being from a directed graph;
executing, using the processing core, the directed graph;
generating, while executing the directed graph and using a processing cluster in the processing core, a value for the unit of directed graph data;
generating a comparison of the value of the unit of directed graph data and the threshold;
conditionally rounding, based on the comparison and using a rounding circuit in the processing core, the value of the unit of directed graph data; and
calculating the threshold using a set of values from the unit of directed graph data;
wherein the unit of directed graph data is a vector; and
wherein the set of values are a set of entries in the vector.

30. A method comprising:
associating, in a processing core, a threshold with a unit of directed graph data, the directed graph data being from a directed graph;
executing, using the processing core, the directed graph;
generating, while executing the directed graph and using a processing cluster in the processing core, a value for the unit of directed graph data;
generating a comparison of the value of the unit of directed graph data and the threshold; and
conditionally rounding, based on the comparison and using a rounding circuit in the processing core, the value of the unit of directed graph data;
wherein:
the unit of directed graph data is a vector with a set of entries;
the entries in the set of entries are stored as floating-point numbers in the processing core;
the value is an exponent of one entry in the set of entries; and
the generating of the comparison includes evaluating the exponent of the entry.

31. A processing core, comprising:
a means for associating a threshold value and a unit of directed graph data according to an association;
a means for generating a value for the unit of directed graph data using input directed graph data;
a means for generating a comparison of the threshold value and the value for the unit of directed graph data using the association;
a means for conditionally rounding the value for the unit of directed graph data based on the comparison; and
a means for compressing the unit of directed graph data after the value for the unit of directed graph data has been conditionally rounded;
wherein the means for compressing uses a run length encoding.

32. A processing core, comprising:
a means for associating a threshold value and a unit of directed graph data according to an association;
a means for generating a value for the unit of directed graph data using input directed graph data;
a means for generating a comparison of the threshold value and the value for the unit of directed graph data using the association;
a means for conditionally rounding the value for the unit of directed graph data based on the comparison; and
a means for generating a zero flag for the unit of directed graph data after the value for the unit of directed graph data has been conditionally rounded;
wherein the means for conditionally rounding rounds the value to zero.

33. A processing core, comprising:
a means for associating a threshold value and a unit of directed graph data according to an association;
a means for generating a value for the unit of directed graph data using input directed graph data;
a means for generating a comparison of the threshold value and the value for the unit of directed graph data using the association;
a means for conditionally rounding the value for the unit of directed graph data based on the comparison; and
a means for generating the threshold value using a set of entries in a vector;
wherein the unit of directed graph data is the vector; and
the value is one entry of the set of entries in the vector.

34. A processing core, comprising:
a means for associating a threshold value and a unit of directed graph data according to an association;
a means for generating a value for the unit of directed graph data using input directed graph data;
a means for generating a comparison of the threshold value and the value for the unit of directed graph data using the association; and a means for conditionally rounding the value for the unit of directed graph data based on the comparison;
wherein:
the unit of directed graph data is a vector with a set of entries;
the entries in the set of entries are stored as floating-point numbers in the processing core; and
the value is an exponent of one entry in the set of entries.

* * * * *